US012149889B2

(12) United States Patent
Meskens et al.

(10) Patent No.: US 12,149,889 B2
(45) **Date of Patent: *Nov. 19, 2024**

(54) ACTUATOR TESTING SYSTEMS AND METHODS

(71) Applicant: Cochlear Limited, Macquarie University (AU)

(72) Inventors: Werner Meskens, Opwijk (BE); Clare James, Sint-Joris-Weert (BE)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,364

(22) Filed: Jun. 28, 2023

(65) Prior Publication Data

US 2023/0345186 A1 Oct. 26, 2023

Related U.S. Application Data

(63) Continuation of application No. 17/499,334, filed on Oct. 12, 2021, now Pat. No. 11,736,869, which is a continuation of application No. 16/765,738, filed as application No. PCT/IB2018/001429 on Nov. 16, 2018, now Pat. No. 11,166,109.

(60) Provisional application No. 62/589,672, filed on Nov. 22, 2017.

(51) Int. Cl.
*H04R 25/00* (2006.01)

(52) U.S. Cl.
CPC ......... *H04R 25/305* (2013.01); *H04R 25/606* (2013.01); *H04R 2420/07* (2013.01); *H04R 2460/13* (2013.01)

(58) Field of Classification Search
CPC .. H04R 2460/13; H04R 25/606; H04R 25/70; H04R 25/30; H04R 29/00; H04R 25/00; H04R 2225/67; H04R 25/305; H04R 3/04; H04R 2420/07
USPC ............................ 381/151, 60, 326; 73/1.82
See application file for complete search history.

(56) References Cited

U.S. PATENT DOCUMENTS

| | | | |
|---|---|---|---|
| 5,419,312 | A | 5/1995 | Arenberg et al. |
| 5,531,787 | A | 7/1996 | Lesinski et al. |
| 8,144,909 | B2 | 3/2012 | Hillbratt et al. |

(Continued)

FOREIGN PATENT DOCUMENTS

| | | | |
|---|---|---|---|
| KR | 10-2003-0091012 | A | 12/2003 |
| WO | 99/07311 | A | 2/1999 |

OTHER PUBLICATIONS

International Search Report and Written Opinion of the International Searching Authority for International Patent Application No. PCT/IB2018/001429 mailed Apr. 26, 2019, 10 pages.

(Continued)

*Primary Examiner* — Norman Yu
(74) *Attorney, Agent, or Firm* — Edell, Shapiro & Finnan, LLC

(57) ABSTRACT

Technologies disclosed herein can be used to test vibrating actuators, such as those found in auditory prostheses. An example test system includes a trigger signal generator that emits a trigger signal, a test frequency generator that operates in a test mode responsive to receiving a trigger signal, and a diagnostic tool comprising a vibration sensor. The diagnostic tool can measure an output of the vibration sensor.

20 Claims, 10 Drawing Sheets

(56) References Cited

U.S. PATENT DOCUMENTS

| | | | | |
|---|---|---|---|---|
| 9,158,891 | B2 | 10/2015 | Hillbratt et al. | |
| 9,380,962 | B2 | 7/2016 | Buchman et al. | |
| 2005/0096561 | A1* | 5/2005 | Conn | H04R 25/30 600/25 |
| 2006/0018488 | A1 | 1/2006 | Viala et al. | |
| 2010/0041940 | A1* | 2/2010 | Hillbratt | H04R 25/606 600/25 |
| 2013/0131437 | A1 | 5/2013 | Mersky | |
| 2013/0245362 | A1 | 9/2013 | Elofsson | |
| 2015/0256943 | A1 | 9/2015 | Inagaki | |
| 2017/0188165 | A1 | 6/2017 | Hillbratt | |
| 2020/0296520 | A1 | 9/2020 | Meskens et al. | |

OTHER PUBLICATIONS

Ai et al., "Diagnosis and validation of damaged piezoelectric sensor in electromechanical impedance technique." Retreived from the Internet: <URL: https://journals.sagepub.com/doi/abs/10.1177/1045389X16657427>, J Intell Mater Syst Struct, 28(7):837-850, Apr. 2017.

Hazelbaker, "Effect of Bone Conduction Transducer Placement on Distortion Product otoacoustic Emissions." Retreived from the Internet: <URL: https://etd.ohiolink.edu/rws_etd/document/get/osu1092677782/inline>, Dissertation, Graduate School of The Ohio State University, 114 pgs, 2004.

Knowles Electronics, LLC, "Accelerometers." Retrieved from the Internet: <URL: http://www.knowles.com/eng/Products/Sensors/Accelerometers>, 2 pgs, 2017.

Maico, "Audiometer MA 41 Perfect Ergonomic Design and Comfortable Handling," 2 pages, Jan. 2019.

Maico, "Diagnostic Audiometers," Retreived from the Internet: <URL: http://www.maico-diagnostics.com/us/product-by-type/audiometers/diagnostic-audiometers/>, 2 pages, 2015.

Maico, "MA 41 and MA 42." 2 pages, Oct. 2018.

Park et al., "Piezoelectric active sensor self-diagnostics using electrical admittance measurements," Retreived from the Internet: <URL: http://vibrationacoustics.asmedigitalcollection.asme.org/article.aspx?articleid=1470867>, J Vib Acoust, 128(4), pp. 469-476, Jan. 24, 2006.

Park et al., "Piezo-sensor self-diagnostics using electrical impedance measurements." Retrieved from the Internet: <URL: http://permalink.lanl.gov/object/tr?what=info:lanl-repo/lareport/LA-UR-04-7511>, Los Alamos National Laboratory, 17 pgs, Jan. 1, 2004.

Purcell et al., "Estimating bone conduction transfer functions using otoacoustic emissions," Retrieved from the Internet: <URL: https://doi.org/10.1121/1.1582436>. The Journal of the Acoustical Society of America, 114(2):907-918, Aug. 2003 [abstract only].

Qin et al., "On frequency characteristics of bone conduction actuators by measuring loudness, acceleration and otoacoustic emission." Retreived from the Internet: <URL: https://www.acoustics.asn.au/conference_proceedings/INTERNOISE2014/papers/p440.pdf>, Internoise, 7 pgs, 2014.

Ross, "Pyroelectric and Piezoelectric Sensors for Point-of-Care Diagnostics," Medical Electronics Design [Online]. Retrieved from the Internet: <URL: http://www.medicalelectronicsdesign.com/print/1384>, 7 pgs, Oct. 19, 2011.

Swanepoel et al., "Validity of diagnostic computer-based air and forehead bone conduction audiometry," Retreived from the Internet: <URL: https://www.ncbi.nlm.nih.gov/pubmed/21391065>, J Occup Environ Hyg, 8(4):210-214, Jan. 22, 2011 [abstract only].

Swanepoel et al., "Validity of Diagnostic Computer-Based Air and Forehead Bone Conduction Audiometry," University of Pretoria, South Africa, 15 pgs, 2011.

Wikipedia, "SoundBite Hearing System." Retreived from the Internet: <URL: https:/len.wikipedia.org/wiki/SoundBite_Hearing_System>, 4 pgs, Sep. 19, 2017.

International Preliminary Report on Patentability for corresponding International Patent Application No. PCT/IB2018/001429 mailed May 26, 2020, 8 pages.

* cited by examiner

ACTUATOR TESTING SYSTEMS AND METHODS

This application is a continuation of U.S. patent application Ser. No. 17/499,334, filed on Oct. 12, 2021, which is a continuation of U.S. patent application Ser. No. 16/765,738, filed on May 20, 2020, which is a National Stage Entry of PCT International Patent Application No. PCT/IB2018/001429, filed on Nov. 16, 2018, which claims priority from U.S. Provisional Patent Application No. 62/589,672, filed on Nov. 22, 2017. The entire disclosure of these applications are hereby incorporated by reference in its entirety.

BACKGROUND

Hearing loss, which can be due to many different causes, is generally of two types: conductive and sensorineural. In many people who are profoundly deaf, the reason for their deafness is sensorineural hearing loss. Those suffering from some forms of sensorineural hearing loss are unable to derive suitable benefit from auditory prostheses that generate mechanical motion of the cochlea fluid. Such individuals can benefit from implantable auditory prostheses that stimulate their auditory nerves in other ways (e.g., electrical, optical, and the like). Cochlear implants are often proposed when the sensorineural hearing loss is due to the absence or destruction of the cochlea hair cells, which transduce acoustic signals into nerve impulses. Auditory brainstem implants might also be proposed when a person experiences sensorineural hearing loss if the auditory nerve, which sends signals from the cochlear to the brain, is severed or not functional.

Conductive hearing loss occurs when the normal mechanical pathways that provide sound to hair cells in the cochlea are impeded, for example, by damage to the ossicular chain or the ear canal. Individuals suffering from conductive hearing loss can retain some form of residual hearing because some or all of the hair cells in the cochlea function normally.

Individuals suffering from conductive hearing loss often receive a conventional hearing aid. Such hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to conventional hearing aids, which rely primarily on the principles of air conduction, certain types of hearing prostheses commonly referred to as bone conduction devices, convert a received sound into vibrations. The vibrations are transferred through the skull to the cochlea causing motion of the perilymph and stimulation of the auditory nerve, which results in the perception of the received sound. Bone conduction devices are suitable to treat a variety of types of hearing loss and can be suitable for individuals who cannot derive sufficient benefit from conventional hearing aids.

SUMMARY

Technologies disclosed herein include systems, apparatuses, devices, and methods that facilitate testing actuators, such as those found in auditory prostheses. Vibrations of an actuator delivered to an auditory prosthesis recipient in vivo can be measured using a diagnostic tool placed in contact with a target location of the recipient near the actuator. The diagnostic tool measures the vibrations and records data associated therewith. The data can be analyzed to determine the status of the actuator, such as whether the actuator is damaged, whether the actuator is positioned properly, or whether the actuator is otherwise not functioning as intended. The readings can be compared to predicted readings that would be expected from a properly functioning actuator. To facilitate testing, a trigger signal can be used to synchronize or coordinate multiple aspects of testing. For example, a trigger signal may be used to coordinate the measurement of vibrations with the generation of frequencies that activate the actuator.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
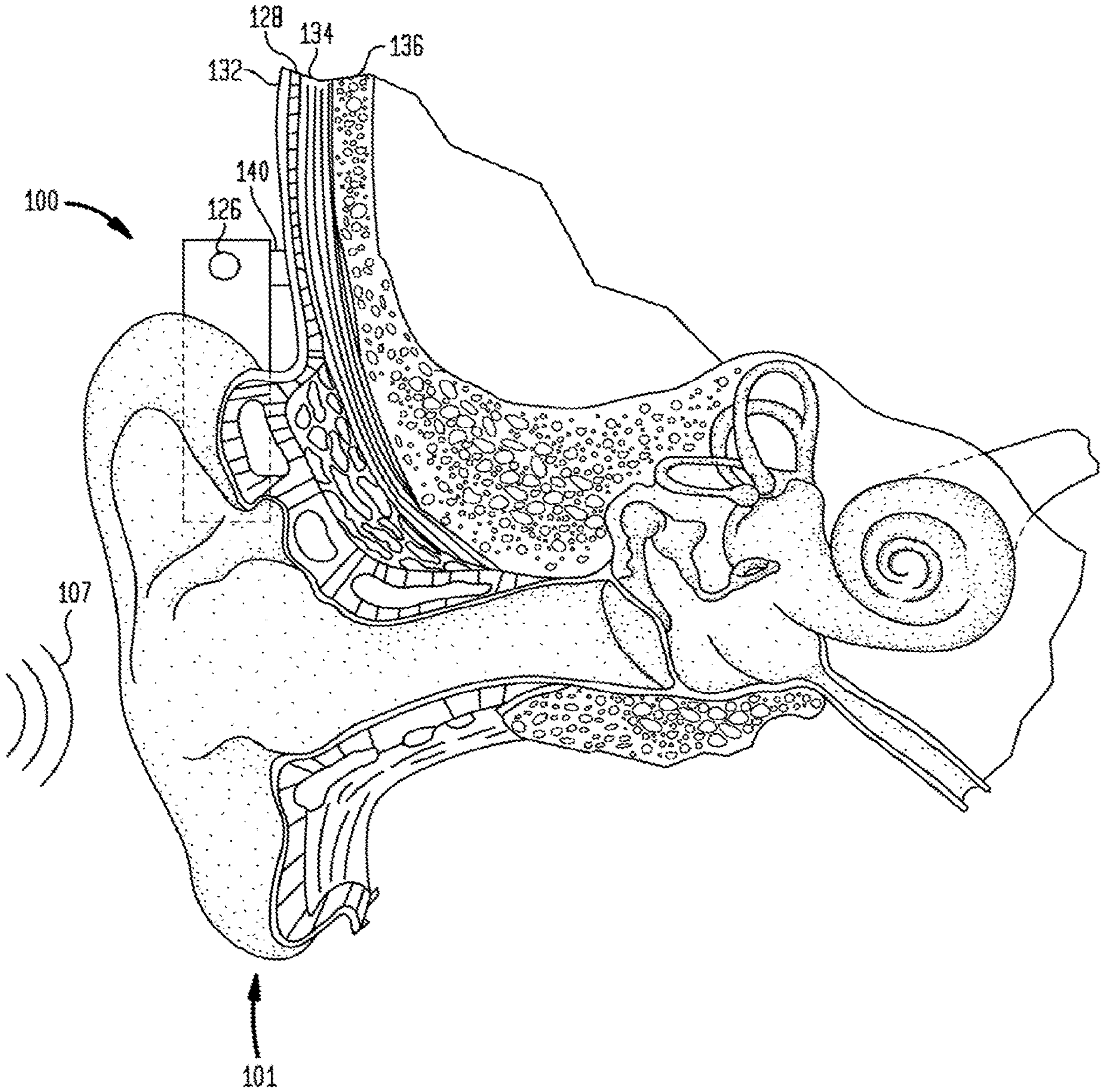
FIG. 1 is a view of an example of a percutaneous bone conduction device that can benefit from use of the technologies disclosed herein.

Technologies disclosed herein include systems and methods for testing actuators, such as vibratory actuators found in bone conduction auditory prostheses and other medical devices. Tests can determine aspects of the actuator, including whether the actuator is damaged, whether the actuator is positioned properly, and whether the actuator is otherwise not functioning as intended, among other aspects. Tests can also determine characteristics of actuators, such as the location and properties of a resonance peak of the actuator. The results of a test can be used to determine if an actuator needs to be repaired, or if parameters of a system need to be updated (e.g., updating firmware of an auditory prosthesis based on a change in a resonance peak of the actuator), and/or to characterize the actuator generally.

One way to test an actuator involves measuring electrical characteristics of the actuator as the actuator vibrates in response to frequencies across a frequency sweep. Small cracks or other defects in a piezo actuator can cause frequency shifts and variations of current. So a status of an actuator can be determined based on electrical current consumption or impedance measurements using electrical, wired connections associated with the actuator. For example, a test may involve measuring an averaged frequency-impedance (current amplitude) measurement from an amplifier bone conduction device of (e.g., an audio Class-D amplifier generating a constant voltage signal). The measurements can be collected at various time intervals while the actuator moves in response to frequencies of a frequency sweep. But this technique has drawbacks. It can be time consuming to obtain sufficiently accurate frequency-amplitude characteristics to discover a shift in a resonance peak or actuator damage. For example, a frequency sweep between 100 Hz and 8,000 Hz with steps of 10 Hz corresponds to 7,900 averaged measurements. Taking that many measurements with high accuracy would take approximately fifteen minutes to perform. Moreover very small cracks inside piezo material of an actuator may not be detectable by electrical current assessment. Further, measuring the electrical current may still miss defects, such as defects in the placement of the actuator and defects in the junction between the actuator and bone.

Technologies disclosed herein can overcome one or more of these drawbacks. In one example, vibrations produced by the actuator are measured using a diagnostic tool placed in contact with a target location near the actuator. As part of the test, a signal generated by a frequency generator stimulates the actuator, which is connected to a material (e.g., bone in the case of a bone conduction auditory prosthesis). Vibrations generated from the actuator are conducted through the material and arrive at the target location near the actuator. These vibrations are captured by a vibration sensor (e.g., a piezo-ceramic accelerometer) of a diagnostic tool in direct or indirect contact with the material (e.g., the skin or a tooth of a recipient) at or near the target location. The vibration sensor measures vibration amplitude and time-frequency information of the sweep. The readings of the sensor can be analyzed to determine the status of the actuator. The readings can be compared to predicted readings that would be expected from a properly functioning actuator. The analysis can detect or infer damage to the actuator, as well as defects in its placement or other issues that may otherwise be missed by measuring electrical characteristics.

To facilitate testing and provide further advantages, a trigger signal can be used. The trigger signal can synchronize or coordinate multiple aspects of testing. For example, a trigger signal may be used to coordinate the measurement of vibrations with the generation of frequencies that activate the actuator. The diagnostic tool may send a trigger signal (e.g., when it begins measuring vibrations) that causes a frequency generator to begin generating frequencies to activate the actuator. Similarly, the frequency generator may send a trigger signal that causes the diagnostic tool to begin measuring vibrations.

In some examples, testing can be conducted without using a trigger signal. For instance, a diagnostic component can obtain vibrations, perform a Fourier transformation on data obtained from the vibrations to determine a frequency associated with the vibrations.

In addition, the frequencies that drive the actuator may be generated in response to a variety of different frequency sweep patterns. For example, there may be an initial frequency sweep pattern to obtain data to determine an overall status of the actuator (e.g. may be used to identify resonance peaks of the actuator) and a subsequent targeted frequency sweeps based on results from the initial pattern. The subsequent, targeted frequency sweep may have a higher accuracy (e.g., smaller step size) focused around points of interest identified in the initial frequency sweep pattern (e.g., resonance peaks and indications of potential damage).

Aspects of the disclosed technology can provide a variety of advantages, including faster transfer of characteristic measurements and faster detection of partially damaged actuators (e.g., during surgery to implant or repair a component of a bone conduction auditory prosthesis). Testing using vibrations can allow for detection of properties that may be missed by analysis of electrical properties of the actuator alone. Wireless transmission of trigger signals can obviate the need for cables between, for example, the diagnostic tool and a frequency sweep generator (e.g., a button-shaped off-the-ear sound processor associated with an actuator). This can prevent the risk of a sound processor falling off of a recipient's head due to the weight and pull forces of a cable.

Figure 2:
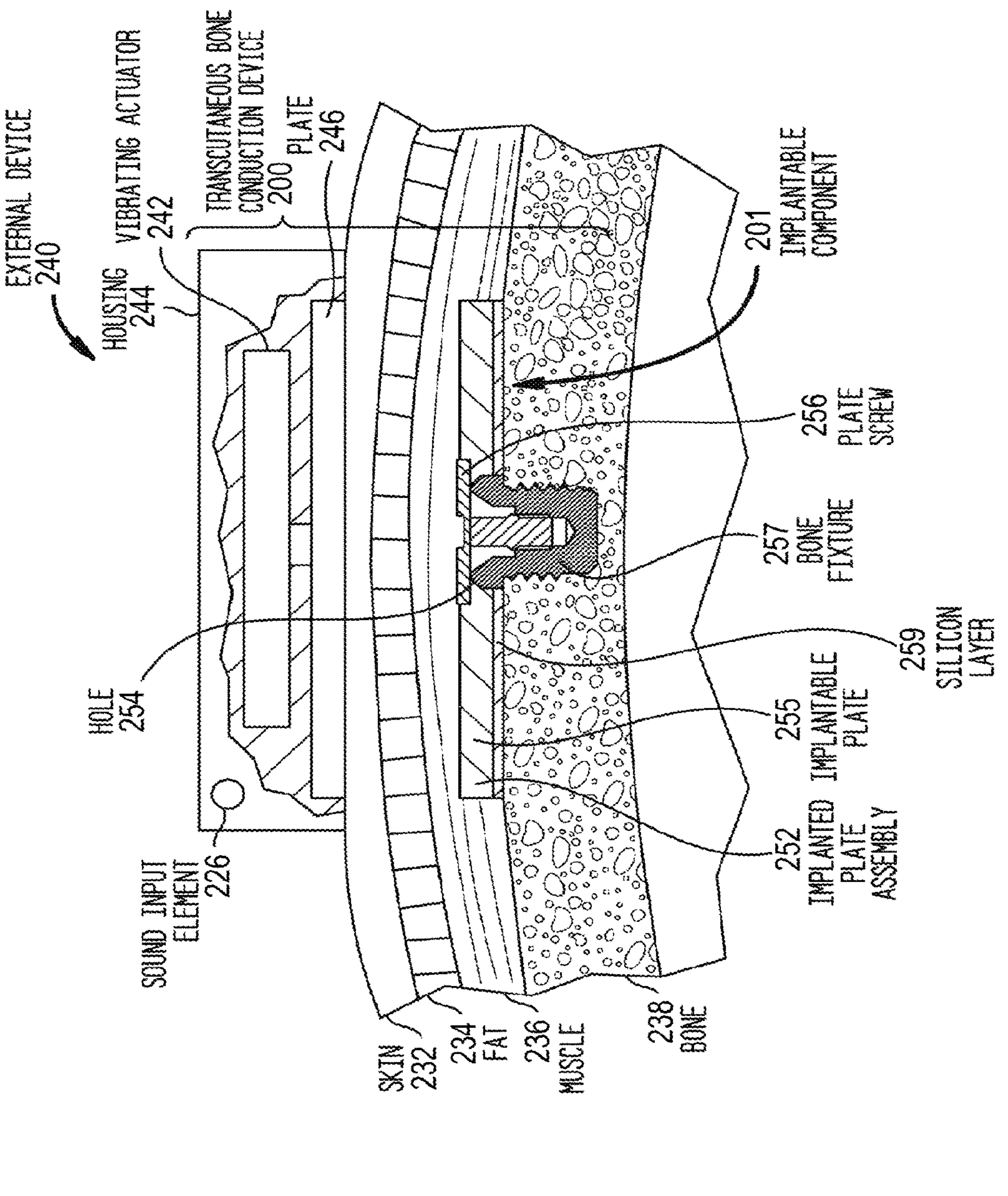
FIG. 2 depicts an example of a transcutaneous bone conduction device with a passive implantable component that can benefit from use of the technologies disclosed herein.
Figure 3A:
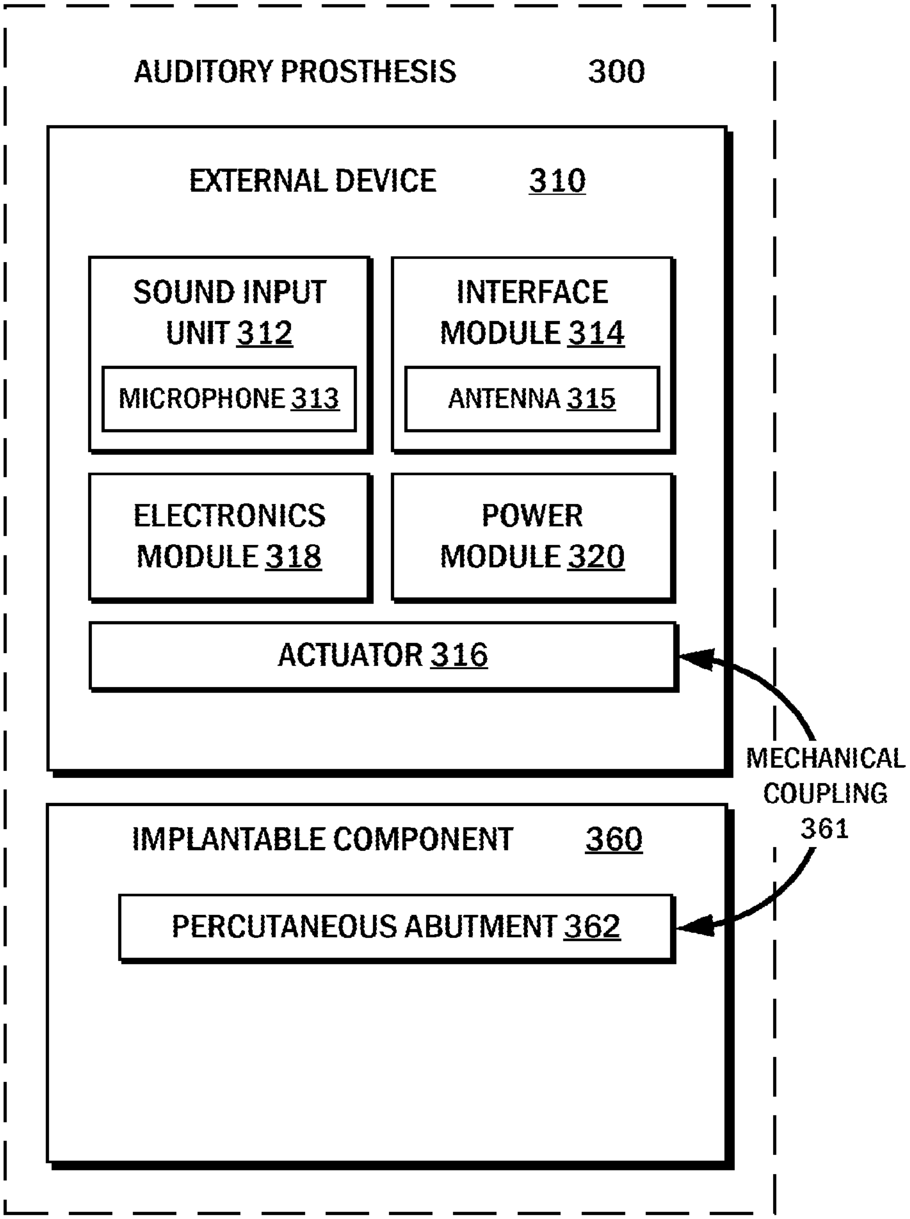
FIGS. 3A, 3B, and 3C are functional block diagrams of bone conduction auditory prostheses that can benefit from the use of and be used in conjunction with certain examples of the technologies described herein.
Figure 3B:
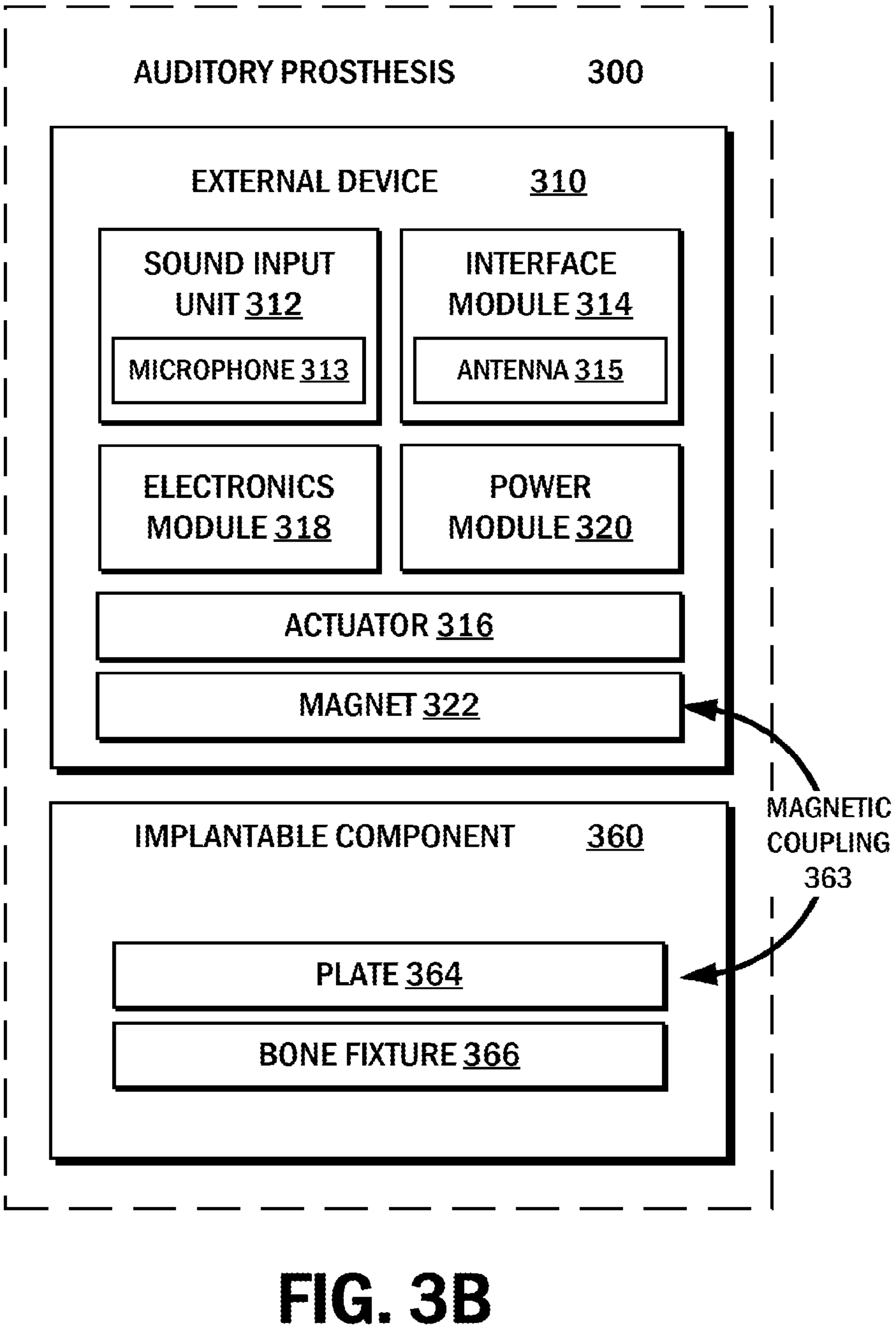
Figure 3C:
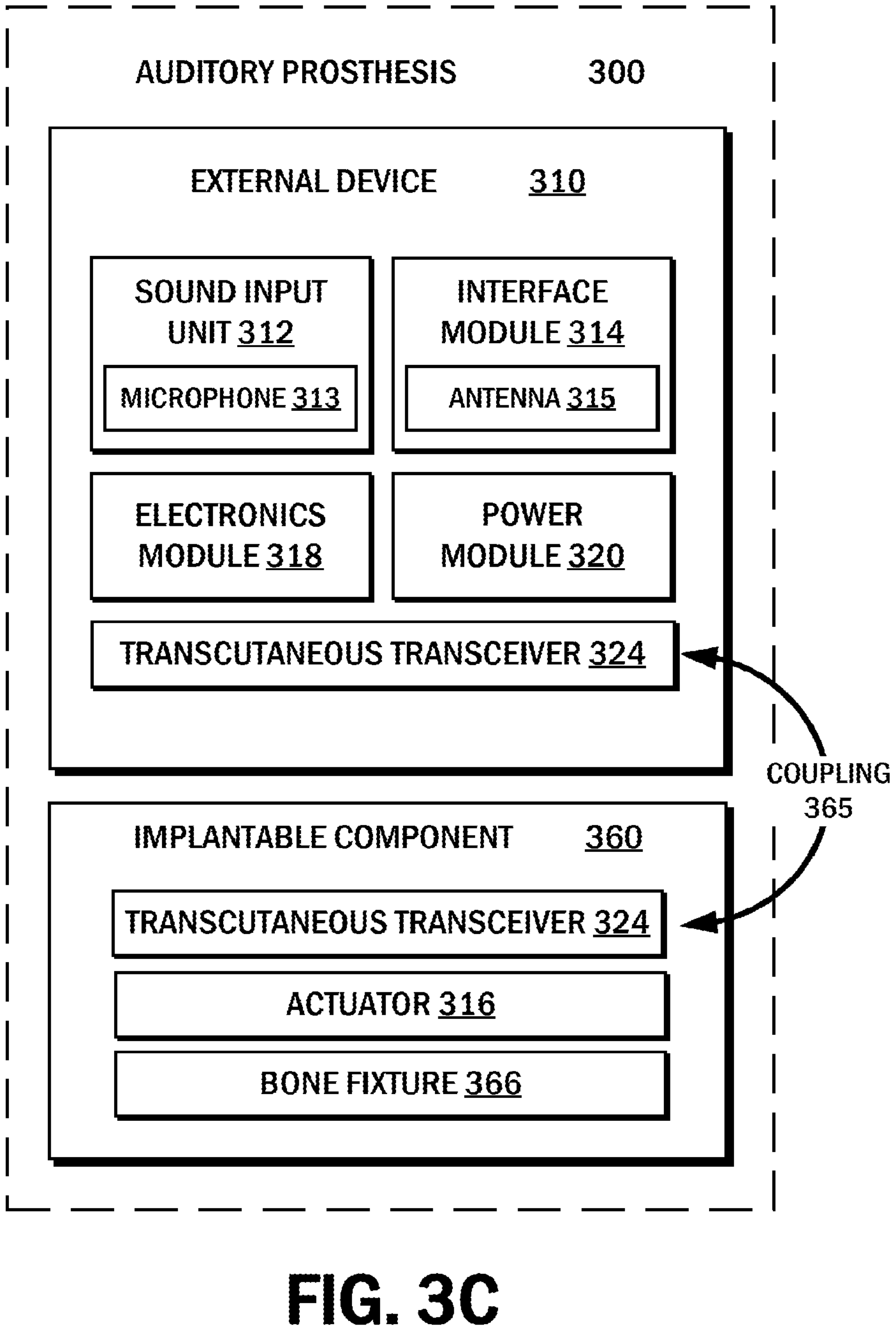

The test systems and other technologies disclosed herein can be used in conjunction with any of a variety of different systems and actuators in accordance with examples of the disclosed technology. For instance, many example test systems disclosed herein are used with medical devices having an actuator and, more particularly, bone conduction hearing devices having actuator. Bone conduction hearing devices include percutaneous bone conduction devices, transcutaneous bone conduction devices (having passive or active implantable components), and tooth-based hearing devices, among others. Examples of percutaneous bone conduction devices are shown in FIGS. 1 and 3A, examples of transcutaneous bone conduction devices with a passive implantable components are shown in FIGS. 2 and 3B, and an example of a transcutaneous bone conduction device with an active implantable component is shown in FIG. 3C.

FIG. 1 is a view of an example of a percutaneous bone conduction device 100 that can benefit from use of the technologies disclosed herein. For example, the device 100 can be tested using one or more aspects of disclosed technology. The bone conduction device 100 is positioned behind an outer ear 101 of a recipient of the device. The bone conduction device 100 includes a sound input element 126 to receive sound signals 107. The sound input element 126 can be a microphone, telecoil or similar. In the present example, the sound input element 126 may be located, for example, on or in the bone conduction device 100, or on a cable extending from the bone conduction device 100. Also, the bone conduction device 100 comprises a sound processor (not shown), a vibrating electromagnetic actuator and/or various other operational components.

More particularly, the sound input element 126 converts received sound signals into electrical signals. These electrical signals are processed by the sound processor. The sound processor generates control signals that cause the actuator to vibrate. In other words, the actuator converts the electrical signals into mechanical force to impart vibrations to a skull bone 136 of the recipient.

The bone conduction device 100 further includes a coupling apparatus 140 to attach the bone conduction device 100 to the recipient. In the example of FIG. 1, the coupling apparatus 140 is attached to an anchor system (not shown) implanted in the recipient. An exemplary anchor system (also referred to as a fixation system) may include a percutaneous abutment fixed to the skull bone 136. The abutment extends from the skull bone 136 through muscle 134, fat 128 and skin 132 so that the coupling apparatus 140 may be attached thereto. Such a percutaneous abutment provides an attachment location for the coupling apparatus 140 that facilitates efficient transmission of mechanical force.

FIG. 2 depicts an example of a transcutaneous bone conduction device 200 having a passive implantable component 201 that can benefit from use of the technologies disclosed herein. The transcutaneous bone conduction device includes an external device 240 and an implantable component 201. The implantable component 201 of FIG. 2 contains a passive plate 255 mounted on the bone 238 and is transcutaneously coupled with a vibrating actuator 242 located in a housing 244 of the external device 240. The plate 255 may be in the form of a permanent magnet and/or in another form that generates and/or is reactive to a magnetic field, or otherwise permits the establishment of magnetic attraction between the external device 240 and the implantable component 250 sufficient to hold the external device 240 against the skin 232 of the recipient.

In an example, the vibrating actuator 242 is a component that converts electrical signals into vibration. In operation, sound input element 226 converts sound into electrical signals. Specifically, the transcutaneous bone conduction device 200 provides these electrical signals to a vibrating actuator 242, or to a sound processor (not shown) that processes the electrical signals, and then provides those processed signals to a vibrating actuator 242. The vibrating actuator 242 converts the electrical signals (processed or unprocessed) into vibrations. Because the vibrating actuator 242 is mechanically coupled to a plate 246, the vibrations are transferred from the vibrating actuator 242 to the plate 246. An implanted plate assembly 252 is part of the implantable component 250, and is made of a ferromagnetic material that may be in the form of a permanent magnet, that generates and/or is reactive to a magnetic field, or otherwise permits the establishment of a magnetic attraction between the external device 240 and the implantable component 250 sufficient to hold the external device 240 against the skin 232 of the recipient. Accordingly, vibrations produced by the vibrating actuator 242 of the external device 240 are transferred from plate 246 across the skin 232, fat 234, and muscle 236 to the plate 255 of the plate assembly 252. This may be accomplished as a result of mechanical conduction of the vibrations through the tissue, resulting from the external device 240 being in direct contact with the skin 232 and/or from the magnetic field between the two plates 246, 255. These vibrations are transferred without penetrating the skin 232 with a solid object such as an abutment as detailed in FIG. 1 with respect to the percutaneous bone conduction device 100.

As may be seen, the implanted plate assembly 252 is substantially rigidly attached to a bone fixture 257 in this example. But other bone fixtures may be used instead in this and other examples. In this regard, the implantable plate assembly 252 includes a through hole 254 that is contoured to the outer contours of the bone fixture 257. The through hole 254 thus forms a bone fixture interface section that is contoured to the exposed section of the bone fixture 257. In an example, the sections are sized and dimensioned such that at least a slip fit or an interference fit exists with respect to the sections. A plate screw 256 is used to secure plate assembly 252 to the bone fixture 257. The head of the plate screw 256 can be larger than the hole through the implantable plate assembly 252, and thus the plate screw 256 positively retains the implantable plate assembly 252 to the bone fixture 257. The portions of plate screw 256 that interface with the bone fixture 257 substantially correspond to an abutment screw detailed in greater detail below, thus permitting the plate screw 256 to readily fit into an existing bone fixture used in a percutaneous bone conduction device. In an example, the plate screw 256 is configured so that the same tools and procedures that are used to install and/or remove an abutment screw from the bone fixture 257 can be used to install and/or remove the plate screw 256 from the bone fixture 257. In some examples, there may be a silicone layer 259 disposed between the plate 255 and bone 136.

FIGS. 3A, 3B and 3C are functional block diagrams of auditory prostheses that can benefit from the use of and be used in conjunction with certain examples of the technology described herein. An auditory prosthesis 300 can include an external device 310 and an implantable component 360. The auditory prosthesis 300 can be configured to operate as any of a variety of different kinds of auditory prostheses, such as an active percutaneous bone conduction device as shown in FIG. 3A, a transcutaneous bone conduction device having a passive implantable component as shown in FIG. 3B, and a transcutaneous bone conduction device having an active implantable component as shown in FIG. 3C. The auditory prosthesis 300 can include a variety of different kinds of components depending on its use. For instance, the auditory prosthesis 300 can include an external device 310 and an implantable component 360. The auditory prosthesis 300 can include or be connected to a sound input unit 312, an interface module 314, an actuator 316, an electronics module 318, and a power module 320, among others.

The external device 310 can be configured as a wearable external device, such that the external device 310 is worn by recipient in close proximity to an area of the skull where the implantable component 360 is located, which is typically a location where vibrations are to be delivered.

The sound input unit 312 is a unit configured to receive sound input. The sound input unit 312 can include a microphone 313 or other sound input components, such as an electrical input (e.g., receiver) for a frequency modulation (FM) hearing system, and/or another component for receiving sound input. The sound input unit 312 can be or include a mixer for mixing multiple sound inputs together. In some examples, the auditory prosthesis 300 can receive an audio frequency transmitted from a separate device (e.g., a smartphone) using a wireless protocol such as BLUETOOTH (maintained by the BLUETOOTH SIG of Kirkland, Washington). BLUETOOTH can include various configurations and varieties of BLUETOOTH, including low energy configurations (BLUETOOTH LE) and basic rate/enhanced data rate configurations (BLUETOOTH BR/EDR). Other wireless protocols may have similar low energy and enhanced data rate configurations that may be used.

The interface module 314 may interface with components of the auditory prosthesis 300, other devices, recipients, or clinicians, among other people and devices. In some examples, the interface module 314 can be used to connect to a fitting system. Using the interface module 314, another device or a person may obtain information from the auditory prosthesis 300 (e.g., the current parameters, data, alarms, etc.) and/or modify the parameters of the auditory prosthesis 300 used in processing received sounds and/or performing other functions. The interface module 314 can include a variety of components, including an antenna 315 for communicating with other devices. The interface module 314 can include one or more buttons, lights, or other components for interacting with people.

The actuator 316 receives an electrical signal (e.g., from the electronics module 318) and generates a mechanical output force in the form of vibrations. The auditory prosthesis 300 can be configured to deliver the vibrations to the skull of the recipient in a variety of ways. Delivery of an output force causes motion or vibration of the recipient's skull, thereby activating the hair cells in the recipient's cochlea via cochlea fluid motion.

The electronics module 318 is a component configured to control one or more aspects of the external device 310 or the auditory prosthesis 300 as a whole. This can include converting sound signals received from the sound input unit 312 or elsewhere into data signals, causing the actuator 316 to vibrate in response thereto, and causing a transceiver unit to transmit power and/or data signals (e.g., transceiver unit 324 of FIG. 3C). The electronics module 318 may include a sound processor, control electronics, transducer drive components, and a variety of other elements. An example electronics module is shown and described in FIG. 4.

Aspects of the auditory prosthesis 300 require power to provide functionality, such as receive or transmit signals, process data, or deliver mechanical stimulation. The power source can be the power module 320, which can be configured for long-term power storage, and can include, for example, one or more rechargeable batteries.

As shown in FIG. 3A, in examples where the auditory prosthesis 300 is configured as a percutaneous bone conduction device, the implantable component 360 can include a percutaneous abutment 362. The percutaneous abutment 362 can be fixed to the recipient's skull and extend from the skull to provide an abutment that facilitates a mechanical coupling 361 between the external device 310 and the percutaneous abutment 362. The mechanical coupling 361 can facilitate not only attachment between the external device 310 and the implantable component 360, but also facilitate the transmission of vibrations. The external device 310 can be configured to attach to the percutaneous abutment 362 and transmit vibration via the percutaneous abutment 362.

As shown in FIG. 3B, in examples where the auditory prosthesis 300 is configured as a transcutaneous device with a passive implantable component, the external device 310 can include the actuator 316 and a component to transcutaneously couple with the implantable component 360. For example, as illustrated, the external device 310 includes a magnet 322 that facilitates a magnetic coupling 363 with a plate 362 of the implantable component 360 that is anchored to a recipient's skull via a bone fixture 364. Further details of an example of such an auditory prosthesis are shown and described in relation to the transcutaneous bone conduction device 200 of FIG. 2.

As shown in FIG. 3C, in examples where the auditory prosthesis 300 is configured as a transcutaneous device with an active implantable component, the actuator 316 can be implanted and can be disposed as part of the implantable component 360. There can also be a coupling 365 between the external device 310 and the implantable component 360. In some examples, the coupling 365 can include a magnetic coupling that facilitates alignment and fixation of the external device 310 the implantable component 360. The coupling 365 can also include a power and/or data connection. To facilitate such a connection, the external device 310 and the implantable component 350 can include respective transcutaneous transceivers 324. The transcutaneous transceivers 324 can enable the implantable component 360 to receive RF power and stimulation data from the external device 310. The implantable component 360 can then use the power and stimulation data to activate the implantable actuator 316. In such examples, magnets or other components can be used to facilitate an operational alignment of the external device 310 with the implantable component 360. With the external device 310 and implantable component 360 in close proximity, the transfer of power and data can be accomplished through the use of near-field electromagnetic radiation, and the components of the external device 310 can be configured for use with near-field electromagnetic radiation. For example the transceivers 324 can be configured for use with near-field electromagnetic radiation to communicate with a coil or other component (not shown) of the implantable component 360.

The transceiver 324 can be configured to send or receive power or data. The transceiver 324 can transcutaneously transmit power and/or data from external device 310 to the implantable component 360. Further, transceiver 324 can include one or components that receive and/or transmit data or power, such as, a coil for a magnetic inductive arrangement, an antenna for an alternative radio frequency (RF) system, capacitive plates, or any other suitable arrangement. In an example, the transmitted data modulates the RF carrier or signal containing power. The transcutaneous communication link established by the transceiver 324 can use time interleaving of power and data on a single RF channel or band to transmit the power and data to the implantable component. Various types of energy transfer, such as infrared, electromagnetic, capacitive and inductive transfer, can be used to transfer the power and/or data from the external device 310 to the implantable component.

The transceiver 324 can include one or more antennas or coils for transmitting power or data signal and one or more antennas or coils for receiving power or data signal. The one or more coils can include a wire antenna coil having of multiple turns of electrically insulated single-strand or multi-strand wire. The electrical insulation of the internal coil can be provided by a flexible silicone molding or another material or configuration. Various types of energy transfer, such as infrared (IR), radiofrequency (RF), electromagnetic, capacitive and inductive transfer, can be used to transfer power or data from external device 310 to implantable component 360. In some examples, the transceiver unit can act as the sound input unit. For instance, in some examples, the external device may receive signals from another device comprising sound input or other data to be converted into vibrations for the actuator. For example, the transceiver unit may include one or more components that allow the external device 310 receive or transmit signals using RF protocols, such as BLUETOOTH or another wireless communications protocol.

As should be appreciated, while examples of systems and apparatuses have been illustrated and discussed above, the kinds of technology that can benefit from the use of aspects disclosed herein need not be so limited.

Figure 4:
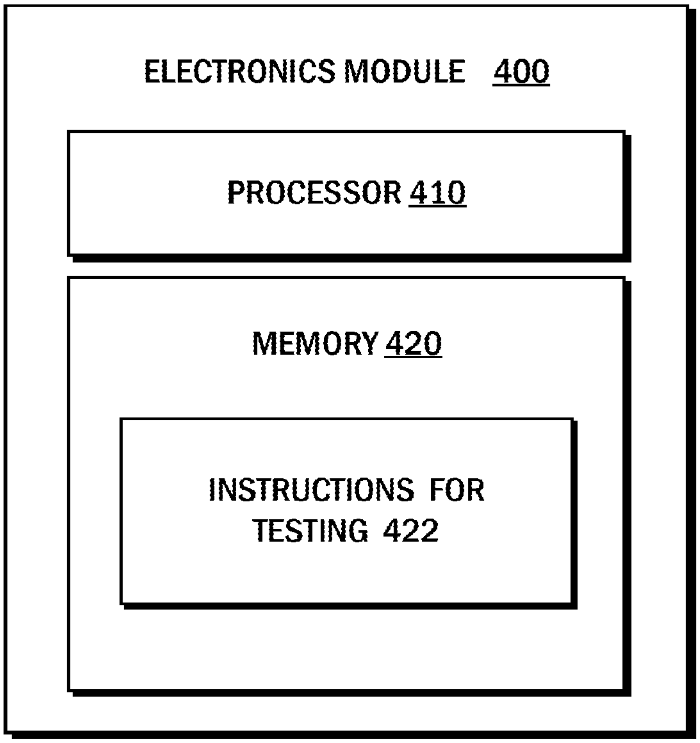
FIG. 4 illustrates an example electronics module that includes a processor and a memory in accordance with the technologies described herein.

FIG. 4 illustrates an example electronics module 400 that includes a processor 410 and a memory 420. The electronics module 400 may be used in conjunction with the auditory prostheses of FIGS. 3A-C. Other components or devices described herein may also include a similar electronics module. The processor 410 can be implemented as one or more microprocessors configured to execute instructions, such as those stored in the memory 420. In some examples, the processor 410 can be implemented using application-specific integrated circuits. The memory 420 can be any of a variety of components configured to store data, such as instructions executable by the processor 410. In some examples, the memory can be implemented as random access memory (RAM), read only memory (ROM), flash memory, or any other kind of memory. The memory 420 can include instructions for execution by the processor 410, such as instructions for testing 422. The instructions for testing 422 can include any of a variety of different kinds of instructions configured to carry out one or more aspects of testing or diagnostics as described herein (e.g., one or more operations shown and described in relation to FIG. 9). For example, the instructions for testing 422 can include instructions for causing the processor 410 to generate a frequency at which to cause the actuator 316 to vibrate, causing the processor 410 to generate a trigger signal, causing the processor 410 to analyze vibrations, or perform other operations.

Figure 5:
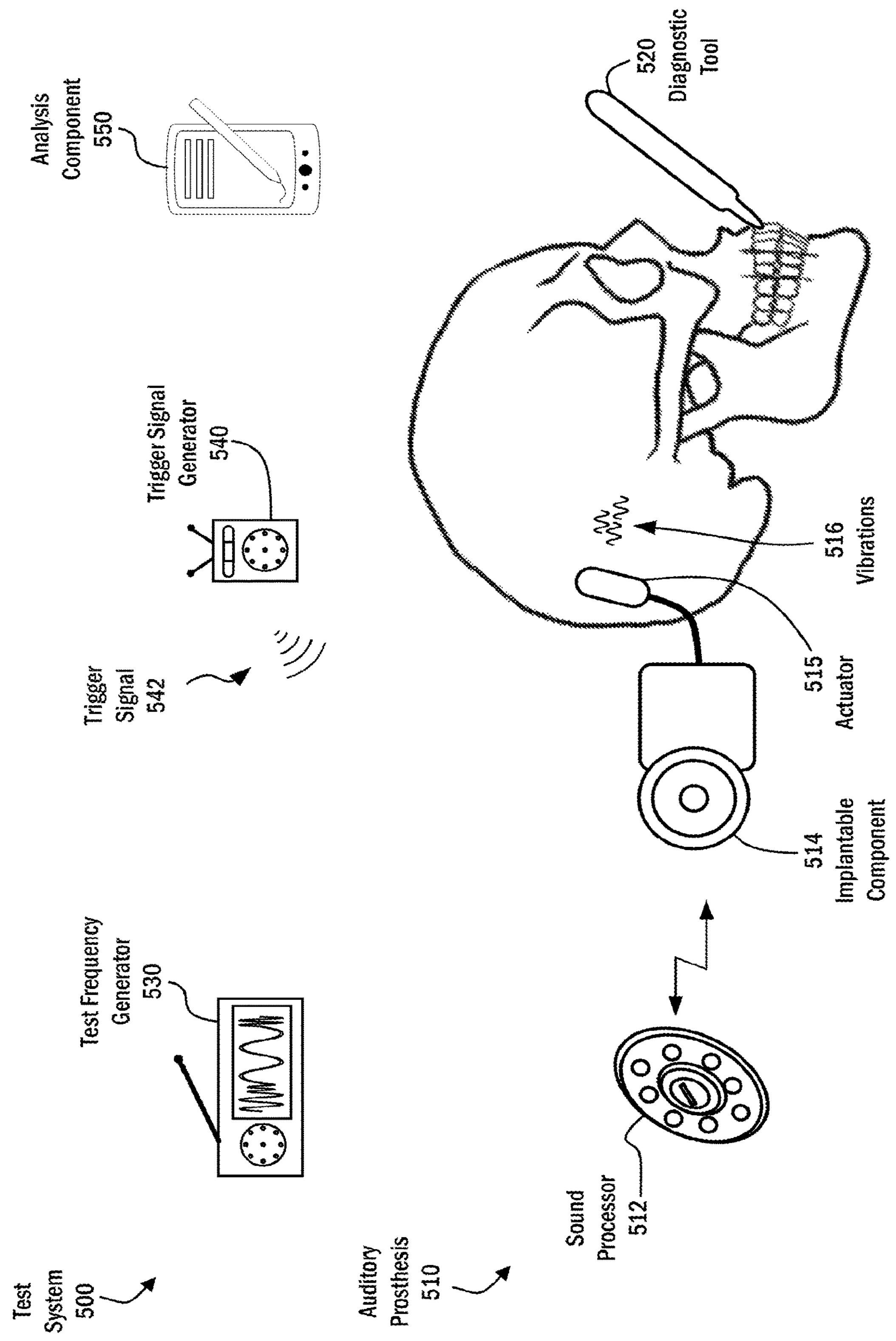
FIG. 5 illustrates an example test system for testing the functioning of an auditory prosthesis in accordance with the technologies described herein.

FIG. 5 illustrates an example test system 500 for testing the functioning of an auditory prosthesis 510. The test system can include a diagnostic tool 520, a test frequency generator 530, a trigger signal generator 540, and an analysis component 550. The auditory prosthesis 510 can be any of a variety different kinds of auditory prosthesis, including those described elsewhere herein. In the illustrated example, the auditory prosthesis 510 is a transcutaneous bone conduction device having an active implantable component where a sound processor 512 is in communication with an implantable component 514 coupled to an implantable actuator 515 for producing vibrations 516. Disclosed examples can be used with other kinds of auditory prostheses (e.g., transcutaneous bone conduction devices having passive implantable components and percutaneous bone conduction devices), devices, and actuators.

The test system 500 can be used to test, among other things, the functioning of the actuator 515. For example, the actuator 515 can be tested to determine whether or not then actuator is damaged, improperly placed, improperly coupled to the other components of the auditory prosthesis 510, or has any other kind of problem. These problems can manifest themselves in the generated vibrations 516 being different from what would be predicted from a properly functioning auditory prosthesis. The test system 500 can include a diagnostic tool 520 configured to receive (directly or indirectly) the vibrations 516 from the actuator 515 to determine the functioning of the auditory prosthesis 510.

Figure 8:
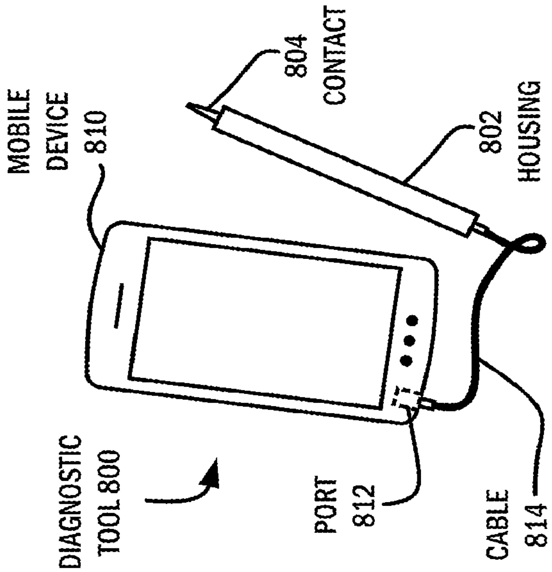
FIG. 8 shows an example of a diagnostic tool that includes a housing with a contact, which are coupled to a mobile device in accordance with the technologies described herein.

The diagnostic tool 520 can be any of a variety of different kinds of tools configured to measure vibrations. The diagnostic tool 520 can take the form of a hand held pen-like device with a tip for contacting a particular location for measuring vibrations at the tip. As illustrated, the functionality of the diagnostic tool 520 is contained within a single device (e.g., the diagnostic tool 520 is contained within a housing of the diagnostic tool). An example of a diagnostic tool is shown and described in FIG. 6. However, in other examples, the diagnostic tool can have functionality spread across multiple devices. An example of such a configuration is shown in FIG. 8.

The test frequency generator 530 is a device or component configured to generate a frequency used in testing the actuator 515. For example, the test frequency generator 530 can generate a frequency according to a frequency sweep pattern and transmit the frequency to the auditory prosthesis 510, which causes the actuator 515 to vibrate based thereon. The test frequency generator 530 can transmit the frequency in a variety of different ways. In some examples, the test frequency generator 530 generates the frequency as audible sound waves that are received by a sound input unit of the auditory prosthesis 510 and which are in turn converted into vibrations 516 using the actuator 515 and other functionality of the auditory prosthesis 510. In other examples, the test frequency generator 530 generates the frequency and encodes the frequency into a data signal, which is then sent to the auditory prosthesis 510 for converting into vibrations based thereon. In some examples, the data signal encodes an audio frequency that is decoded by the auditory prosthesis 510 (e.g., test frequency generator 530 streams audio data to the auditory prosthesis 510, which causes the actuator 515 to vibrate based thereon). The test frequency generator 530 can be configured in a variety of ways. In many examples, the test frequency generator 530 will include a memory for storing frequency patterns or frequency generation rules, a processor for carrying out frequency generation based on the stored data, and a transmission component for transmitting the frequency to the relevant components. Although illustrated as its own discrete device, the test frequency generator 530 need not be a standalone device. Instead, the test frequency generator 530 can be a component of one or more other devices. In some examples, the test frequency generator 530 can be a component built into the sound processor 512 of the auditory prosthesis 510. For instance, the test frequency generator 530 can be a component for use when the sound processor 512 is being operated in a testing or debugging mode. In some examples, the test frequency generator 530 can be implemented with one or more of the diagnostic tool 520, test a trigger signal generator 540, and analysis component 550. One or more of these components can share processor, memory, and transmitter components.

The trigger signal generator 540 is a device or component configured to generate and emit a trigger signal 542. The trigger signal 542 is a signal configured to begin, synchronize, or otherwise effect one or more aspects of testing. The trigger signal 542 can be received by the auditory prosthesis 510 to cause the auditory prosthesis to take a particular action. For example, the trigger signal 542 can cause the actuator 515 to generate (or cease generating) particular vibrations 516, to cause the auditory prosthesis 510 to listen (or cease listening) for signals from the test frequency generator 530, to cause one or more components to enter (or exit) a testing mode or to take another action. The trigger signal 542 can be received by the diagnostic tool 520 and cause the diagnostic tool 520 to take an action in response. For example, the trigger signal 542 can cause the diagnostic tool 520 to begin (or end) measuring vibrations 516, to begin (or end) recording measured vibrations 516, or take another action. The trigger signal 542 can be received by the test frequency generator 530 and cause the test frequency generator 530 to take an action in response. For example, the trigger signal 542 can cause the test frequency generator 530 to begin (or end) generating test frequencies, to begin (or end) transmitting test frequencies, to begin (or end) a particular frequency sweep, or take another action. The trigger signal 542 can be received by the analysis component 550 to cause it to take a particular action. For example, the trigger signal 542 can cause the analysis component 550 to make a particular record or take another action. For instance, the analysis component 550 may record data or metadata regarding the trigger signal 542 (e.g., when the trigger signal 542 was received, the location of the analysis component 550 or diagnostic tool 520 at that time, the type of trigger signal 542, and data carried by the trigger signal 542, among other data). The trigger signal 542 can be received by other components or devices. In some examples, the trigger signal 542 is detectable by a person to indicate the beginning or end of testing.

The trigger signal 542 can take a variety of different forms. In some examples, the trigger signal 542 is an audible signal. For instance, the trigger signal 542 may be a sound that can be received by one or more of the auditory prosthesis 510 (e.g., at a sound input unit thereof), the diagnostic tool 520 (e.g., at a microphone thereof), the analysis component 550 (e.g., at a microphone thereof), or another device or component. The sound may have a particular characteristic that makes it discernible by one or more of those components as a trigger signal. For instance, the sound may have a particular frequency, duration, pattern, or other characteristic.

In other examples, the trigger signal 542 is a visual signal. For instance, the visual signal can include flashes of light of particular duration, wavelength, or color. In some examples, the trigger signal 542 can include wavelengths beyond the visible spectrum. For instance, the trigger signal 542 can be within the infrared spectrum.

In other examples, the trigger signal 542 is an electrical signal. For instance, the trigger signal generator 540 can be a component directly electrically connected to another component or device (e.g., the sound processor 512 and the diagnostic tool 520). The trigger signal 542 can be an electrical signal transmitted via such a direct electrical connection (e.g. via a wire connecting the components).

In some examples, the trigger signal 542 is sent using radiofrequency transmission. For example, the trigger signal 542 can be data sent over BLUETOOTH, WI-FI (a standard maintained by the WI-FI ALLIANCE of Austin, Texas), or another wireless communications medium. The trigger signal 542 can be a packet of data sent along such a communications medium.

The trigger signal 542 can carry data, such as data indicating a particular test to perform (e.g., an identifier of a test or frequency sweep pattern), particular characteristic s of the test, a particular action to perform, authentication information, security information, or other information. In other examples, the trigger signal 542 can carry substantially no data. For instance the trigger signal 542 can encode no more information than is necessary to be discernible as a trigger signal 542.

A trigger signal 542 may be configured for particular components or devices (e.g., carry device- or component-specific data, formatting, encoding, authentication, etc.). In some examples, a trigger signal 542 is configured to affect a single device (e.g., each device is sent its own trigger signal). In some examples, a trigger signal 542 can be configured for or otherwise affect multiple devices or components (e.g., the sound processor 512 and the diagnostic tool 520 can receive a same trigger signal 542 configured as an audible sound). Each component or device may have its own trigger signal 542. The same trigger signal 542 can be sent for multiple devices. For instance, there may be a single trigger signal 542 and the auditory prosthesis 510 and the diagnostic tool 520 are capable of receiving and responding to that same trigger; or there may be multiple, functionally identical signals sent to multiple devices or components. In other instances, a different signal can be sent to each of the components. For instance, the auditory prosthesis 510 may be configured to receive a signal in the form of a particularly configured soundwave, while the diagnostic tool 520 can be configured to receive the trigger signal via a data packet sent via BLUETOOTH. In another example, the trigger signal 542 is not sent to a particular device and is instead sent broadly. For instance, the trigger signal 542 may be an audio signal not configured for a particular recipient and instead is emitted such that the trigger signal 542 may be picked up by devices or components nearby.

Because the trigger signal 542 can take a variety of different forms, the trigger signal generator 540 may also take a variety of different forms configured to generate and emit the trigger signal 542. In an example, the trigger signal generator 540 comprises a memory that stores instructions, a processor for executing the stored instructions, and a component configured to emit the trigger signal 542. The emitter may, for example, be a radio frequency transmitter (e.g., where the trigger signal 542 is sent over BLUETOOTH or WI-FI), a light source (e.g., where the trigger signal 542 is a visible spectrum light), an infrared emitter, a speaker, a circuit component (e.g., where the trigger signal 542 is an electrical signal) and other components as configured for use in emitting the trigger signal 542. The trigger signal generator 540 can also include an interface element (e.g., button or physical or virtual port) so a user or device can cause the trigger signal generator 542 emit the trigger signal 542 or specify a particular trigger signal 542 to emit.

The analysis component 550 is a device or component for analyzing test data gathered by one or more components of the test system 500. For example, the analysis component 550 can be one or more computing devices (e.g., mobile phone, tablet, computer, server, etc.) having software configured to analyze the data and provide useful output based on the testing. For example, the software can determine whether the actuator 515 is functioning properly, determine particular characteristics of the functioning of the actuator 515 (e.g., a location of a resonant peak associated with the actuator), determine adjustments of parameters or settings of the auditory prosthesis 510, and determine suggestions for further testing for the auditory prosthesis 510, among others.

Although several components of the test system 500 have been illustrated as being separate components, they need not be. For example, two or more of the auditory prosthesis 510, diagnostic tool 520, test frequency generator 530, trigger signal generator 540, and analysis component 550 can be part of a same device (e.g., disposed within a same housing) or even a single device or component may be capable of performing the functions or having one or more characteristics of multiple different components. For example, the test frequency generator 530 may be a stand-alone device with a processor, memory, and transmitter used to not only generate and transmit a test frequency but also generate and transmit a trigger signal. In an example, there may be a first housing that includes a vibration sensor a second housing (e.g., a housing of a smartphone or other mobile device) that includes the test frequency generator and one or more other components, and a third housing, that corresponds to the auditory prosthesis. The components contained within the housings may be connected over a wired or wireless connection (e.g., the test frequency generator within the second housing may have a wired or wireless audio link with the auditory prosthesis components within the third housing).

In another example, the sound processor 512 may be able to enter a test mode that causes the sound processor 512 to act as a test frequency generator, send a trigger signal via vibrations to a diagnostic tool, analyze the results of the test, or take one or more other actions. In still another example, a device may be configured to implement one or more aspects of a test frequency generator 530, a trigger signal generator 540 and an analysis component 550. For example, there may be a computing device (e.g., a phone or tablet) configured to act as a test frequency generator 530 (e.g., software running on the computing device may cause the generation of a test frequency and the computing device may send a frequency to the sound processor 512 via BLUETOOTH), act as a trigger signal generator 540 (e.g., software running on the computing device may cause the generation of the trigger signal 542 and cause the computing device to emit the trigger signal 542) and act as the diagnostic tool 520 (e.g., the computing device may have accelerometer or other component usable as the diagnostic tool 520). In some examples, the sound processor 512 or another component can store results of testing (e.g., raw data or analyses based thereon) for later comparison or use during future tests.

Figure 6:
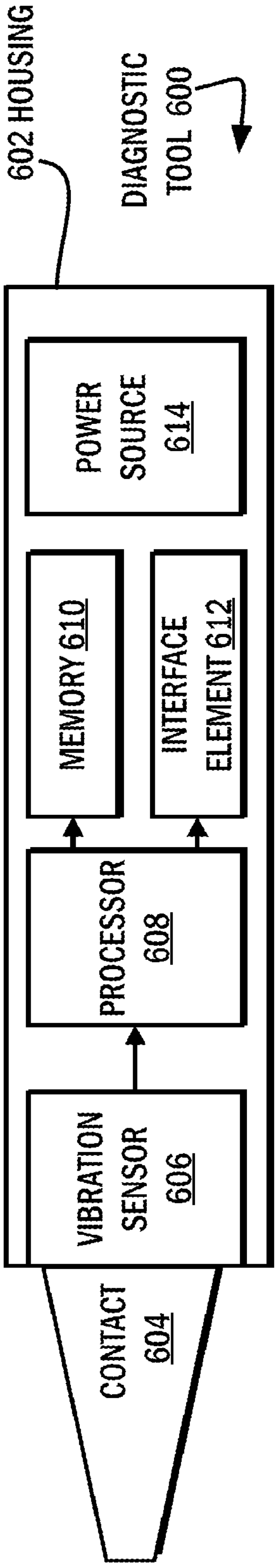
FIG. 6 illustrates an example of a diagnostic tool in accordance with the technologies described herein.

FIG. 6 illustrates an example implementation of a diagnostic tool 600 that includes a housing 602, a contact 604, a vibration sensor 606, a processor 608, a memory 610, an interface element 612, and a power source 614. In the illustrated example, the housing 602 is elongate and configured to facilitate handheld use. In particular, the housing is arranged so that a user can grasp the housing and place the contact 604 against a location at which a measurement is to be taken. The contact 604 is a portion of the diagnostic tool 600 configured to be placed in contact with a target location at which a measurement is to be taken. The contact 604 facilitates the transmission of vibrations from a distal tip of the contact 604 to the vibration sensor 606 to facilitate measurements. The contact 604 can have a variety of different shapes and sizes depending on a location in which it is to be used. For example, where the contact 604 is to be placed in contact with a tooth of a recipient, the contact may be elongate and sized and shaped to be placed in contact with the tooth. In instances where the diagnostic tool 600 is to be used to take otoacoustic vibrations within an ear canal, the contact 604 may be sized and shaped for inserting into an ear canal. Likewise, the material from which the contact 604 is constructed may be selected based on this usage. In many instances, will be desirable for the contact 604 to be made from a material that promotes the transmission of vibrations from the distal tip of the contact 604 to its proximal end. The contact 604 may extend from the housing 602 and have a proximal end in vibratory communication with the vibration sensor 606. In some examples, the contact 604 may be removable. Prior to using the diagnostic tool 600, a user may select a contact 604 material or type that is suitable for a particular purpose and couple the selected contact 604 to the diagnostic tool 600.

The vibration sensor 606 is a component configured to convert vibrations into electrical signals for processing and analysis. The vibration sensor 606 can include a piezo accelerometer (e.g., a piezo-ceramic accelerometer). The vibration sensor 606 can include a contact microphone. An example vibration sensor 606 is shown and described in more detail in relation to FIG. 7. In an example, the vibration sensor 606 can be a piezo-ceramic accelerometer.

The processor 608 can be any kind of processor capable of executing instructions or executing a particular task. The processor 608 can be coupled to memory 610, which can be used to store instructions for operating the diagnostic tool 600. The memory 610 can also be used to store readings from the vibration sensor 606. For example, readings can be stored in memory 610 until they are accessed by, for example, the analysis component 550.

The interface element 612 can be a component usable by a user to interface with the device 600 to cause the device 600 to take a particular action. For example, the interface element 612 can be used to power on or power off the device 600. The interface element 612 can also be used to start or end measurements. Further still, the interface element 612 can be used to change one or more parameters or settings of the diagnostic tool 600. The interface element 612 can be used to activate other functionality of the diagnostic tool 600. For example, the diagnostic tool 600 may provide some or all functionality of a trigger generator or a test signal generator and the interface element 612 can activate or otherwise facilitate use of that functionality. The interface element 612 can be a user-accessible interface element, such as one or more buttons, touchscreens, voice interfaces, or other components. In addition or instead, the interface element 612 can be a communication interface allowing the diagnostic tool 600 to interface with other devices or components of the test system 500. For example, the interface element 612 can include an antenna or radio for communicating wirelessly with the analysis tool, with the trigger signal generator, or with other devices or components. The power source 614 can include one or more batteries or other components for storing power used by the diagnostic tool 600 to operate.

Figure 7:
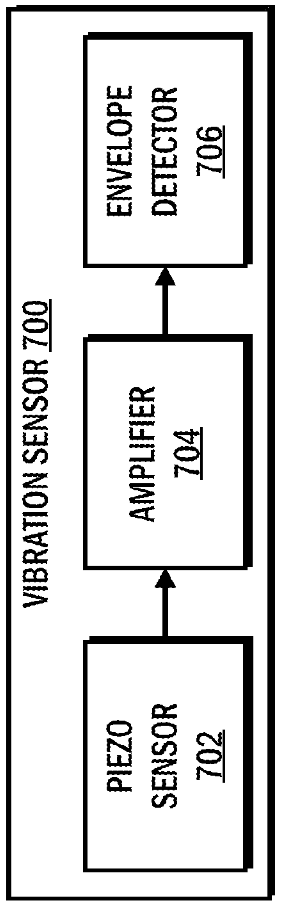
FIG. 7 illustrates an example of a vibration sensor of a diagnostic tool in accordance with the technologies described herein.

FIG. 7 illustrates an example embodiment of the vibration sensor 700. The vibration sensor 700 can include a piezo sensor 702 coupled to an amplifier 704 that is connected to an envelope detector 706. The piezo sensor 702 can convert vibrations (e.g., vibrations conducted to the piezo sensor 702 using the contact 604) into electrical signals. The amplifier 704 can amplify the signals from the piezo sensor 702, and the envelope detector 706 can apply an envelope function to the amplified signals.

Although the various components of the diagnostic tool 600 are shown as being within a single housing 602, they need not be. For example, the components of the diagnostic tool 600 can be spread across multiple discrete devices. Similarly, the one or more components of the vibration sensor 700 can be spread across multiple devices. As an example, FIG. 8 shows an embodiment of a diagnostic tool 800 that includes a housing 802 with a contact 804, which are coupled to a mobile device 810. As illustrated, a port 812 (e.g., a microphone port or data port) of the mobile device 810 receives a cable 814 that electrically couples the mobile device 810 to one or more components located in the housing 802. In other examples, the connection is made wirelessly instead of using the cable 814. In the arrangement illustrated in FIG. 8, one or more of the components of the diagnostic tool 600 can be located within the mobile device 810. For example, a vibration sensor 700 may be disposed within the housing 802 and one or more components of the mobile device 810 can provide the functionality that would have been provided by the processor 608, the memory 610, the interface element 612, and the power source 614 of the diagnostic tool 600. This arrangement may allow the portion of the diagnostic tool 800 that is placed in contact with a target location to be smaller, lighter, or otherwise more suited for this purpose. For example, moving the power source 614 to the mobile device 810 can result in the portion held by the user being lighter, thinner, or generally more ergonomic.

Figure 9:
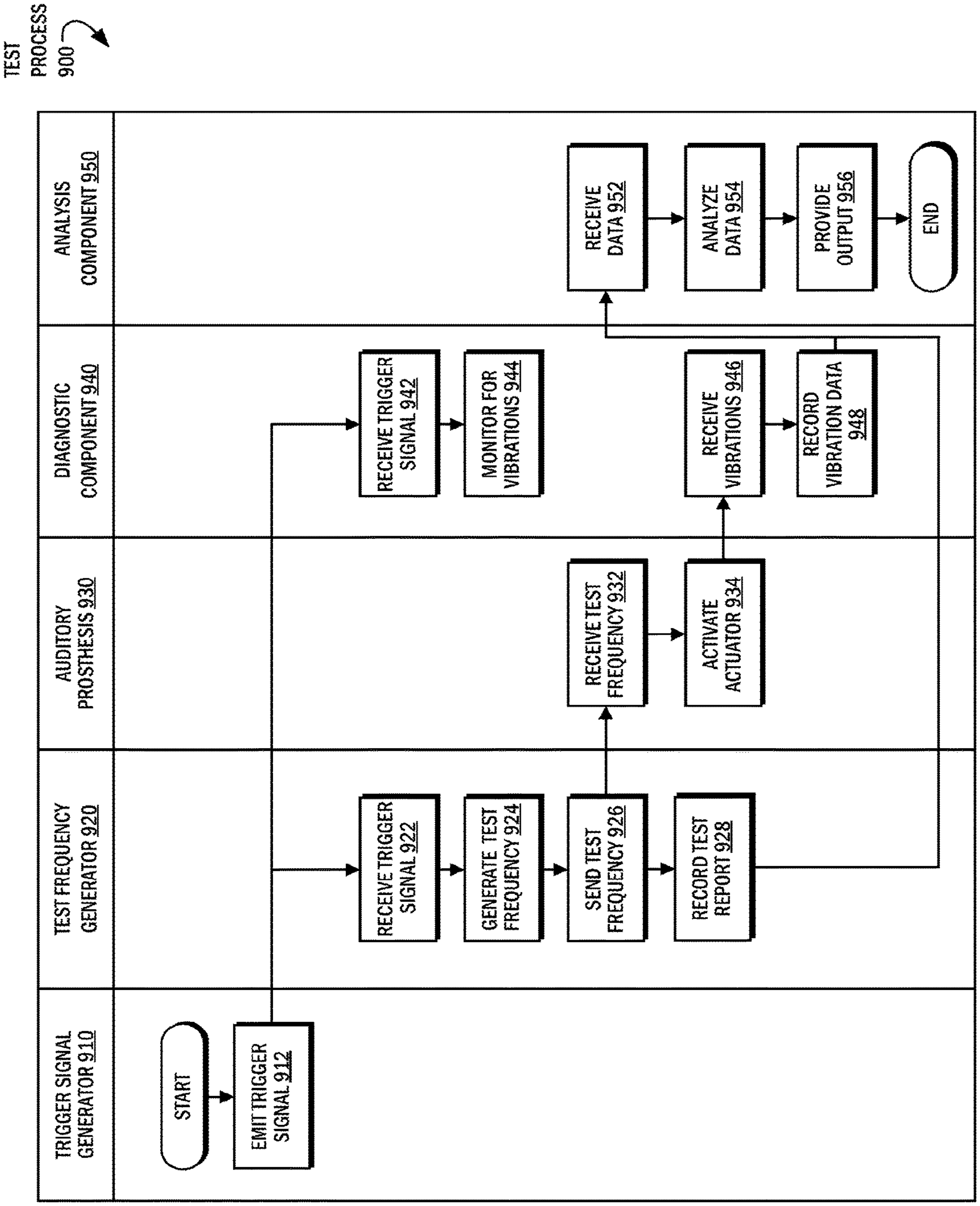
FIG. 9 illustrates an example test process as may be used by a test system in accordance with the technologies described herein.

FIG. 9 illustrates an example test process 900 as may be used by a test system (e.g., test system 500 of FIG. 5). The test process 900 involves five components: a trigger signal generator 910 (e.g., trigger signal generator 540 of FIG. 5), a test frequency generator 920 (e.g., test frequency generator 530 of FIG. 5), and auditory prosthesis 930 (e.g., auditory prosthesis 510 of FIG. 5), and diagnostic component 940 (e.g., diagnostic tool 520 of FIG. 5), and an analysis component 950 (e.g., analysis component 550 of FIG. 5).

Prior to the beginning of the illustrated test process 900, various preparatory steps can be taken. These preparatory steps can include, but need not be limited to, setting up or configuring one or more of the components involved in the test process 900. This can involve moving one or more of the components into a test mode, connecting components together (e.g., via a wired or wireless connection), authenticating one or more components or connections, preparing the recipient of the auditory prosthesis for testing, and removing one or more components from sterile packaging as needed, among others.

The preparatory steps can include running a self-test on the diagnostic component 940. For example, this self-test can involve running one or more tests on the diagnostic component 940 to ensure that it is in basic working order and otherwise configured to perform the test process 900. This may also involve calibrating the diagnostic component for the test process. For example, this may involve placing a contact of the diagnostic component 940 against a target location of the subject and taking one or more measurements prior to causing vibrations with the actuator. For example, this process can be used to determine a base level of noise, variability, or sensitivity and then be used to calibrate the diagnostic component 940 accordingly.

The preparatory steps can also include placing the diagnostic component 940 in a position to receive vibrations. This can involve, for example, placing a contact of the diagnostic component 940 at or near a target location. The target location can vary based on many different factors including but not limited to the kind of testing that is desired to be performed as well as the type of auditory prosthesis 930. For example, where the auditory prosthesis 930 is a direct acoustic actuator (e.g., an actuator directly coupled to one or more bones of the middle ear), the target location may be a space within the ear canal of the recipient of the auditory prosthesis. In some examples, the target location is selected based on its ability to receive vibrations generated by the actuator. Generally speaking, locating the diagnostic component 940 at a target location close to the actuator can result in higher quality readings by the diagnostic component 940 than if the diagnostic component 940 were located further away. In some examples, the target location is at a tooth, ear (e.g., near the ear, within the ear, at the outer ear, or at another location related to the ear), actuator, or another location.

The process 900 can begin with operation 912, which involves using the trigger signal generator to generate one or more trigger signals and emit the one or more trigger signals. An emitted trigger signal can be of a variety of different kinds of trigger signals, including those described previously herein in relation to trigger signal 542 of FIG. 5. For example, where the trigger signal is an audio tone, emitting the trigger signal can involve generating the audio tone using a speaker of the trigger signal generator. For example, where the trigger signal is a data packet, the trigger signal can be transmitted using a radio transmitter (e.g., configured to transmit using BLUETOOTH or WI-FI). In some examples, the trigger signal can be emitted in response to a user activating a user interface element associated with emitting the trigger signal. For example, there may be a button on the diagnostic component 940 that, when pressed, emits the trigger signal. The trigger signal may be emitted both external to the diagnostic component 940 (e.g., to a test frequency generator 920 remote from the diagnostic component 940) and internal to the diagnostic component 940 (e.g., there may be a circuit connection to another portion of the diagnostic component 940 to cause the diagnostic component 940 to monitor for vibrations such as in operation 944).

At operation 922, the test frequency generator 920 can receive the trigger signal, and at operation 942, the diagnostic component 940 can receive the trigger signal. The test frequency generator 920 and the diagnostic component 940 can receive the trigger signal in a variety of ways, depending on how the trigger signal is emitted and in what form it is in. For example, where the trigger signal is an audio tone, the receiving of the trigger signal can involve receiving the audio tone at a sound input unit. Where the trigger signal is a data packet, the trigger signal can be received over a BLUETOOTH, WI-FI, Ethernet, or another wired or wireless connection. Where the trigger signal is an electrical signal, the trigger signal can be received over a direct circuit connection or a direct wired connection. As previously discussed, the test frequency generator 920 and the diagnostic component 940 may, but need not necessarily, receive the same trigger signal. For example, the trigger signal generator 910 may emit multiple trigger signals each having a particular intended recipient component.

At operation 944, the diagnostic component 940 can monitor for vibrations. For example, as part of the preparatory steps, the diagnostic component 940 may be placed in contact with or otherwise in proximity to a target location at which it is desirable to monitor for vibrations. In some examples, the diagnostic component 940 begins monitoring for vibrations or begins recording vibrations with substantially no delay after receiving the trigger signal (e.g., the next step taken by the diagnostic component 940 during the normal course of operation is to monitor for or begin recording vibrations). In other examples, the diagnostic component 940 can be configured to begin recording or monitoring vibrations after a certain amount of delay or at a particular time. For example, the trigger signal may include data indicating a particular time at which to begin taking a next step in the process. In another example, the diagnostic component 940 may be configured to begin at a particular time after receiving the trigger signal. For example, in order to properly synchronize multiple different components, it may be desirable to have the components take a next step at, for example the beginning of a next minute rather than substantially immediately after receiving the trigger signal. This may be helpful in facilitating a simultaneous start among multiple components, which may have various delays in receiving and identifying a trigger signal.

In some examples, monitoring for vibrations can involve transitioning the diagnostic component 940 from a non-monitoring mode to a monitoring mode. In some examples, monitoring for vibrations can involve recording received vibrations. For example, the diagnostic component 940 may monitor for vibrations without necessarily recording data associated with the vibrations that were received (e.g., saving data associated with received vibrations to memory). In another example, monitoring for vibrations may involve activating one or more components of the diagnostic component 940 to monitor for vibrations. For instance, this may involve powering or otherwise activating an amplifier of a vibration sensor (e.g., amplifier 704 of vibration sensor 700 in FIG. 7). In some examples, the diagnostic component 940 may monitor for vibrations (e.g., the diagnostic component 940 may be configured to monitor for vibrations whenever the component 940 is powered) and after receiving the trigger signal at operation 942, the diagnostic component 940 may record a time at which the trigger signal was received. This may allow for easier analysis of data later on by allowing the analysis component 950 to find a start time of the test in the data.

At operation 924, the test frequency generator 920 can generate a test frequency. This operation 924 can be responsive to the test frequency generator 920 receiving the trigger signal in operation 922. For example, the test frequency generator 920 can switch into a test mode responsive to receiving the trigger signal in operation 922. In the test mode, the test frequency generator can generate a test frequency. In some examples, the test frequency generator 920 begins generating the test frequency 924 with substantially no delay between receiving the trigger signal and generating the test frequency (e.g., the next step performed by the test frequency generator in its normal course of operation is the generation of the test frequency). In other examples, the test frequency generator 920 can be configured to begin generating the test frequency after a certain amount of delay or at a particular time. For example, the trigger signal may include data indicating a particular time at which to begin generating the test signal or otherwise take a next step as part of test process 900. In another example, the test frequency generator 920 may be configured to begin at a particular time after receiving a trigger signal.

The test frequency itself may be generated in a variety of ways. In many examples, the test frequency generator 920 will include a test frequency sweep pattern that defines multiple frequency values across a range. For instance, the test frequency generator may have a test frequency pattern defined in memory that includes values corresponding to frequencies at 10 Hz intervals between 100 Hz and 10,000 Hz. In such an instance, generating the test frequency may involve generating each frequency as defined by the values of the frequency pattern. In another instance, the test frequency pattern may be customized to a particular auditory prosthesis, particular actuator, particular recipient, particular test, or otherwise customized. For example, the test frequency pattern may define a higher accuracy (e.g., smaller intervals) around actual or predicted resonant peaks of the actuator and relatively lower accuracy at other locations in the frequency pattern.

In some examples, generating the test frequency or test frequency pattern may be based on previously measured results. For example, as previously described, there may be a general test pattern and then a subsequent, more specific test pattern to test a specific subset of interest of the general test pattern (e.g., a location of a resonance peak or suspected damage). The generation of the test frequency may vary depending on a relationship between the test frequency generator 920 and the auditory prosthesis 930. For example, where the test frequency generator is a component of the auditory prosthesis 930 (e.g., a component that is activated when the auditory prosthesis 930 enters into a selected test mode), then generating the test frequency may involve generating an electrical signal indicative of a particular test frequency at which the actuator is to vibrate. Where the test frequency generator 920 is separate from the auditory prosthesis, generating the test frequency may involve generating a data packet configured to cause the auditory prosthesis to vibrate the actuator at the particular test frequency or in a manner based on the test frequency.

Operation 926 involves sending the test frequency. This can vary depending on how the test frequency is generated. For example, where the test frequency is a data packet indicative of a particular frequency, sending the test frequency can involve sending a data packet to the audio prosthesis via BLUETOOTH or another data connection. Where the test frequency is an audio tone, this can involve generating the audio tone with a speaker of the test frequency generator 920. In some examples, the audio tone can be sent as a wireless audio stream via BLUETOOTH or another data connection to the auditory prosthesis 930.

Operation 928 involves recording a test report. At this operation, the test frequency generator 920 can record data or metadata regarding the test process 900. This may involve for example, taking a timestamp at the time the trigger signal was received. This may further involve taking a timestamp or making any other recordings indicative of a particular test frequency that was generated, as well as the particular time at which the test frequency is sent. This information can facilitate the analysis of data. Accordingly, the test frequency generator 920 may be configured to provide the data to the analysis component 950. This may involve, for example, placing the test frequency generator 920 and the analysis component 950 into a wired or wireless data connection and transferring the data in the test report from the test frequency generator 920 to the analysis component 950.

Operation 932 involves the auditory prosthesis 930 receiving the test frequency. The auditory prosthesis 930 can receive the test frequency in a variety of ways depending on how the test frequency was generated and sent in operations 924 and 926, respectively. At operation 934, the auditory prosthesis 930 can activate an actuator of the auditory prosthesis 930 based on the received test frequency. For example, the auditory prosthesis can cause an actuator of the auditory prosthesis 932 to vibrate based on the received test frequency.

The vibrations of the actuator can travel from the actuator through tissue of a recipient. For instance, the vibrations can travel through the recipient's skull to the cochlea causing stimulation of the auditory nerve. The vibrations can also travel to a location proximate a portion of the diagnostic component 940.

Operation 946 involves the diagnostic component 940 receiving vibrations. The received vibrations can include vibrations caused by the actuator of the auditory prosthesis 930 vibrating. The vibrations can also include other vibrations not caused by the actuator the auditory prosthesis. The diagnostic component 940 receiving vibrations can involve, for example the diagnostic component 940 receiving vibrations at a contact element, which is in contact at a target location that is vibrating. The contact can conduct the vibrations to a vibration sensor of the diagnostic component 940 where they are converted into data. At operation 948, the vibration data based on the received vibrations is recorded.

Operation 952 involves the analysis component 950 receiving data. The data can be received from the test frequency generator 920 and the diagnostic component 940, among other components. The data can be received in a variety of different ways. In one example, the test frequency generator 920 and the diagnostic component 940 are put in signal communication with the analysis component 950 (e.g., via a wired or wireless connection). While in signal communication, the components can transmit the recorded data (e.g., the data recorded in operation 928 and in operation 948) to the analysis component 950.

Operation 954 involves analyzing the received data. This can involve performing statistical analysis on the data. This can involve comparing the received data at the diagnostic component 940 with predicted vibration data. The comparison can be facilitated using the trigger signal. For example, if the frequency pattern followed by the generator 920 is linear or known to the diagnostic tool or the analysis component 950, then the time since the trigger frequency was received can be used to know what frequency is expected. For example, the analysis component 950 may know that at 3 seconds after receiving the trigger signal, the frequency pattern will cause the generator 920 to generate a 3,000 Hz frequency. So at three seconds of data measured by the diagnostic component 940, the analysis component 950 will expect that a 3,000 Hz frequency caused the measured vibration.

In some examples, multiple trigger signals may be used to indicate multiple different points in time during a test (e.g. trigger signals may indicate beginnings, middles, ends, or other portions of a test or test sections). The trigger signals used may be captured by one or more components of a test system and recorded as part of data that is ultimately received and analyzed by the analysis component 950. The analysis component 950 can use this data in order to facilitate its analysis.

Differences between the actual and predicted vibration data can indicate one or more problems with the actuator. In some examples, analyzing the received data may involve analyzing the received data using a machine learning framework. For example, the machine learning framework may be trained using training data and the analysis involves providing the obtained data as input to the machine learning framework and obtaining output from the machine learning framework. The machine learning framework can be implemented in a variety of ways. One or more aspects of the machine learning framework may be implemented using for example, TENSORFLOW by GOOGLE INC. of Mountain View, California or MICROSOFT AZURE MACHINE LEARNING by MICROSOFT CORP. of Redmond, Washington.

Operation 956 involves providing output based on the analysis of the data. In some examples, this may be a summary of the findings (e.g., the results of the statistical analysis), in some examples, the output may include recommended or suggested settings changes for the auditory prosthesis 930. For example, the analysis component 950 may determine that a resonance peak of the auditory prosthesis 930 shifted compared to previous measurements and provide recommended changes to firmware or settings of the auditory prosthesis 932 take into account the change. In some examples, the output may include a health status of the auditory prosthesis. In some examples, this may involve recommendations for follow-up tests to conduct.

In some examples, the output may be to the frequency generator 920 and may cause the frequency generator 920 to generate a particular frequency. For instance, the analysis component 950 may have a feedback loop with the frequency generator 920 whereby the analysis component 950 can control generation frequencies in order to focus on particular points of interest within a frequency spectrum. In some examples, the output, analysis, and data on which the analysis was bases may be stored by one or more components of the system. In some examples, information can be stored remotely, such as at a cloud-based storage system connected to an analysis component or another component via the Internet.

Figure 10:
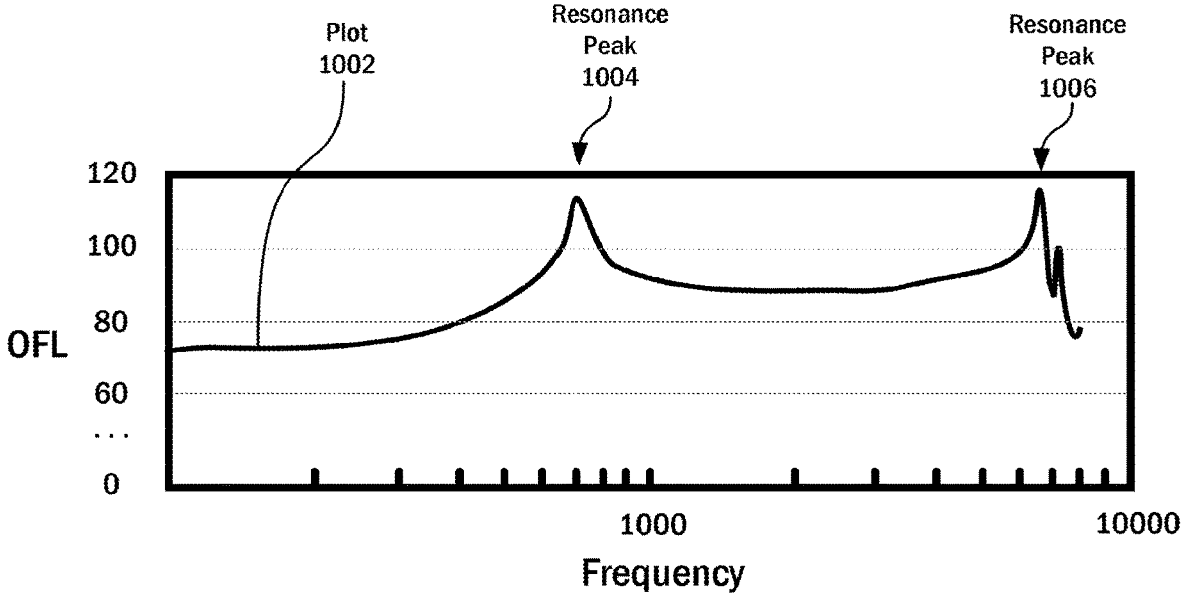
FIG. 10 illustrates in an example plot indicative of a properly functioning actuator of an auditory prosthesis.

FIG. 10 illustrates an example plot 1002 indicative of a properly functioning actuator of an auditory prosthesis. The plot 1002 illustrates an Output Force Level (OFL) in dB relative to 1 Newton (Y-axis) across a variety of frequencies (X-axis). The OFL can be measured at the tip of the actuator. The plot 1002 defines a first resonance peak 1004 and a second resonance peak 1006.

Figure 11:
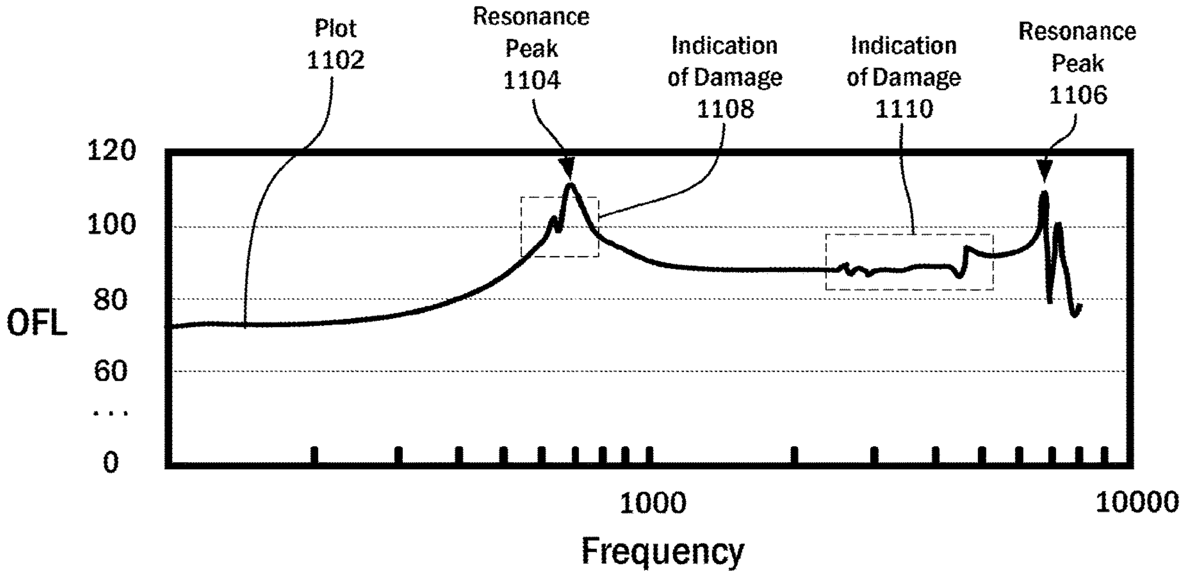
FIG. 11 illustrates an example plot indicative of an improperly functioning actuator of an auditory prosthesis.

FIG. 11 illustrates an example plot 1102 indicative of an improperly functioning actuator of an auditory prosthesis. In addition to defining a first resonance peak 1104 and a second resonance peak 1106, the example plot 1102 includes an indication of the damage 1108 near the first resonance peak 1104 and in the indication of damage 1110 near the second resonance peak 1106. Comparing the properly functioning actuator illustrated in example plot 1002 with the improperly functioning actuator illustrated in the plot 1102, it can be seen that indications of damage 1108 and indications of damage 1110 can appear in the data as aberrations in an area of a curve that is otherwise smooth. For example, these can include sharp increases or decreases.

As should be appreciated, while particular uses of the technology have been illustrated and discussed above, the disclosed technology can be used with a variety of devices in accordance with many examples of the technology. The above discussion is not meant to suggest that the disclosed technology is only suitable for implementation within systems akin to that illustrated in and described with respect to FIGS. 1 and 2. In general, additional configurations can be used to practice the methods and systems herein and/or some aspects described can be excluded without departing from the methods and systems disclosed herein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. An implantable device test system, comprising:

an implantable device, comprising:

a frequency sweep generator configured to, responsive to one or more trigger signals output by a trigger signal generator, generate a frequency sweep pattern; and an implantable actuator configured to generate frequency sweep vibrations and deliver the frequency sweep vibrations to a recipient of the implantable device in accordance with the frequency sweep pattern; and a diagnostic tool separate from the implantable device, wherein the diagnostic tool comprises a vibration sensor configured to contact the recipient, and wherein the diagnostic tool is configured to, responsive to the one or more trigger signals output by the trigger signal generator, measure an output of the vibration sensor as a result of the frequency sweep vibrations.

2. The implantable device test system of claim 1, wherein the frequency sweep generator is configured to:

generate a frequency signal based on the frequency sweep pattern, wherein the frequency signal defines a plurality of test frequency values; and deliver the frequency signal to the implantable actuator to actuate the implantable actuator in accordance with the plurality of test frequency values.

3. The implantable device test system of claim 1, wherein the diagnostic tool comprises a contact that is movable relative to the recipient to place the contact on any one of a plurality of anatomical locations of the recipient, and wherein the contact is configured to conduct the frequency sweep vibrations emanating from the implantable device to the vibration sensor.

4. The implantable device test system of claim 1, wherein the diagnostic tool comprises a processor communicatively coupled to the vibration sensor and configured to obtain the output of the vibration sensor and provide a report based on the output for assessment of a status of the implantable device.

5. The implantable device test system of claim 1, comprising the trigger signal generator configured to output the one or more trigger signals.

6. The implantable device test system of claim 5, wherein the diagnostic tool comprises the trigger signal generator.

7. The implantable device test system of claim 1, wherein the frequency sweep generator is configured generate the frequency sweep pattern based on a location and property of a resonance peak of the implantable actuator.

8. The implantable device test system of claim 7, wherein the frequency sweep generator is configured to generate the frequency sweep pattern to have a variable frequency step size that is relatively smaller around the resonance peak of the implantable actuator.

9. The implantable device test system of claim 1, wherein the diagnostic tool is configured to obtain signal amplitude measurements and time-frequency measurements associated with the output of the vibration sensor.

10. A system, comprising:

a trigger signal generator configured to emit one or more trigger signals to cause an implantable device to generate a frequency sweep pattern and deliver frequency sweep vibrations to a recipient in accordance with the frequency sweep pattern; and a diagnostic tool comprising a vibration sensor, wherein the diagnostic tool is separate from the implantable device and is configured to:

receive the one or more trigger signals; and responsive to the one or more trigger signals, measure an output of the vibration sensor as a result of the frequency sweep vibrations delivered to the recipient.

11. The system of claim 10, wherein the trigger signal generator is configured to wirelessly emit the one or more trigger signals to the implantable device.

12. The system of claim 10, wherein the trigger signal generator is configured to emit the one or more trigger signals to synchronize delivery of the frequency sweep vibrations by the implantable device with measurement of the output of the vibration sensor by the diagnostic tool.

13. The system of claim 12, wherein the trigger signal generator is configured to emit a first one of the one or more trigger signals to the implantable device and emit a second one of the one or more trigger signals to the diagnostic tool to synchronize delivery of the frequency sweep vibrations by the implantable device with measurement of the output of the vibration sensor by the diagnostic tool.

14. The system of claim 10, wherein the diagnostic tool is external to the recipient.

15. The system of claim 14, wherein the diagnostic tool comprises a contact configured to be placed on any one of a plurality of anatomical locations of the recipient, and wherein the contact is configured to conduct the frequency sweep vibrations emanating from the implantable device to the vibration sensor.

16. A method, comprising:

responsive to one or more trigger signals emitted by a trigger signal generator, generating a frequency sweep pattern at a frequency generator;

generating vibrations in accordance with the frequency sweep pattern at an implantable actuator;

delivering the vibrations to a recipient of the implantable actuator via the implantable actuator;

responsive to the one or more trigger signals emitted by the trigger signal generator, measuring the vibrations generated in accordance with the frequency sweep pattern and delivered to the recipient with a vibration sensor that is external to the recipient.

17. The method of claim 16, comprising:

analyzing, via a processor, the vibrations measured with the vibration sensor to determine a response of the implantable actuator.

18. The method of claim 17, comprising:

responsive to one or more additional trigger signals emitted by the trigger signal generator, generating an additional frequency sweep pattern at the frequency generator based on the analyzing of the vibrations measured with the vibration sensor;

generating additional vibrations in accordance with the additional frequency sweep pattern at the implantable actuator;

delivering the additional vibrations to the recipient of the implantable actuator via the implantable actuator; and responsive to the one or more additional trigger signals emitted by the trigger signal generator, measuring the additional vibrations generated in accordance with the additional frequency sweep pattern and delivered to the recipient with the vibration sensor.

19. The method of claim 16, comprising:

wirelessly streaming data representing the frequency sweep pattern from the frequency generator to the implantable actuator.

20. The method of claim 16, comprising:

generating the one or more trigger signals at the trigger signal generator, wherein a diagnostic tool comprises the trigger signal generator and the vibration sensor.

* * * * *